US010158554B1

(12) United States Patent
Bae et al.

(10) Patent No.: US 10,158,554 B1
(45) Date of Patent: Dec. 18, 2018

(54) HEURISTIC TOPOLOGY MANAGEMENT SYSTEM FOR DIRECTIONAL WIRELESS NETWORKS

(75) Inventors: Sang Ho Bae, Sammamish, WA (US); Sharon F. Arroyo, Sammamish, WA (US); Darryn Frafford, Seattle, WA (US)

(73) Assignee: The Boeing Company, Chicago, IL (US)

( * ) Notice: Subject to any disclaimer, the term of this patent is extended or adjusted under 35 U.S.C. 154(b) by 149 days.

(21) Appl. No.: 13/408,138

(22) Filed: Feb. 29, 2012

(51) Int. Cl.
*H04L 12/751* (2013.01)

(52) U.S. Cl.
CPC .................................. *H04L 45/02* (2013.01)

(58) Field of Classification Search
CPC ...... H04L 45/02; H04L 12/28; H04W 40/246; H04W 24/02; H04W 16/18; H04W 24/08; H04W 28/08; H04B 7/0408; H04B 7/0491
USPC .......................................... 370/255; 455/418
See application file for complete search history.

(56) References Cited

U.S. PATENT DOCUMENTS

| | | | | |
|---|---|---|---|---|
| 6,262,976 B1 * | 7/2001 | McNamara | ............. | H04L 45/00 370/254 |
| 6,594,268 B1 * | 7/2003 | Aukia | ..................... | H04L 45/04 370/230 |
| 6,909,700 B1 * | 6/2005 | Benmohamed | ....... | H04L 41/145 370/231 |
| 7,336,617 B1 * | 2/2008 | Liu | ......................... | H04L 45/00 370/252 |
| 7,953,015 B2 * | 5/2011 | Qing | .................... | H04L 67/1034 370/242 |
| 8,072,977 B2 * | 12/2011 | Omar | .................. | H04W 36/385 370/230 |
| 8,325,627 B2 * | 12/2012 | Pratt, Jr. | ................. | H04L 12/66 370/255 |
| 2003/0179742 A1 * | 9/2003 | Ogier | .................... | H04L 1/1614 370/351 |
| 2004/0082338 A1 * | 4/2004 | Norrgard | ................ | H04L 29/06 455/452.2 |

(Continued)

OTHER PUBLICATIONS

Bae, K., "Directional Network Management. Mobile Communications and Network Management," presented by The Boeing Company (Dec. 9, 2010).

(Continued)

*Primary Examiner* — Andrew W Chriss
*Assistant Examiner* — Rasha Fayed
(74) *Attorney, Agent, or Firm* — Vivacqua Law (57) ABSTRACT

Systems and methods for managing the link topology of a directional wireless network having mobile communications nodes. In a general aspect, the method includes the steps of receiving a plurality of resource requests from a plurality of mobile communications nodes, classifying the received plurality of resource requests as at least one class of traffic flow overlay having one or more specified constraints, determining a link topology solution based upon the at least one class of overlay and the one or more specified constraints, and publishing a topology policy based upon an optimized link topology solution to the plurality of communications nodes. The determination of the link topology solution may involve the use of a mixed integer linear programming solver, a Lagrangian relaxation solver, and/or a Lagrangian relaxation solver implementing a Lagrangian heuristic.

16 Claims, 6 Drawing Sheets

(56) References Cited

U.S. PATENT DOCUMENTS

| | | | |
|---|---|---|---|
| 2005/0076173 A1* | 4/2005 | Merril | H04L 45/02 711/100 |
| 2005/0076336 A1* | 4/2005 | Cutrell | H04L 45/02 718/100 |
| 2005/0195835 A1* | 9/2005 | Savage | H04L 43/00 370/401 |
| 2006/0092855 A1* | 5/2006 | Chiu | H04L 45/02 370/254 |
| 2008/0062862 A1* | 3/2008 | Goyal | H04L 45/00 370/218 |
| 2008/0189416 A1* | 8/2008 | Yamada | H04L 29/06 709/226 |
| 2009/0185508 A1* | 7/2009 | Duke | H04L 45/02 370/255 |
| 2010/0046396 A1* | 2/2010 | Cai | H04W 24/02 370/254 |
| 2011/0002240 A1* | 1/2011 | Harel | H04L 45/02 370/254 |
| 2011/0170448 A1* | 7/2011 | Buob | H04L 41/00 370/252 |
| 2011/0228785 A1* | 9/2011 | Filsfils | H04L 45/02 370/395.31 |
| 2011/0258284 A1* | 10/2011 | Sundstrom | H04L 45/00 709/215 |
| 2012/0137336 A1* | 5/2012 | Applegate | H04N 21/2225 725/95 |
| 2013/0159550 A1* | 6/2013 | Vasseur | H04W 40/248 709/242 |

OTHER PUBLICATIONS

Belotti, P. et al., "Shared Protection network design: valid inequalities and a decomposition approach," Technical Paper published by Politecnico di Milano, 2003.

Costa, A., "Analytic Modelling of Agent-Based Network Routing Algorithms," thesis submitted to the University of Adelaide, Australia (issued Nov. 4, 2002).

Dorsett, M. et al., "Directional Network Management," presented by the Boeing Company (May 12, 2011).

Hadynski, G. et al., "Optimization of Directional Antenna Network Topology in Airborne Networks," MILCOM2010, IEEE (2010).

Krishnamurthi, N. et al., "Topology Control for Future Airborne Networks," MILCOM2009, IEEE (2009).

Stewart, S., "Topology Management for Directional Antenna-based Networks," Navy SBIR 2008.2—Topic N08-198, at http://www.navysbir.com/n08_2/N082-198.htm (2008).

Velez, P. et al., "Dynamic Topology Optimization and Transition Schemes for Assuring Connectivity in Multihop Mobile Optical Wireless Communications Networks," MILCOM2009, IEEE (2009).

* cited by examiner

HEURISTIC TOPOLOGY MANAGEMENT SYSTEM FOR DIRECTIONAL WIRELESS NETWORKS

FIELD

The subject matter described herein generally relates to a system and method for optimizing the link topology of and traffic flows within a directional wireless network. In some aspects, heuristic optimizations are used to generate optimized network link topologies based upon specified constraints and resource requests.

BACKGROUND

Mobile sensing, command, and weapons platforms, generically referred to as mobile communications nodes, commonly share Intelligence, Surveillance, and Reconnaissance (ISR) data and/or tactical data across directional wireless communications networks. These networks are generally not directly managed by data exchange applications interacting with the physical, data link, or network layers. Instead, an autonomous management service is used to optimize the network link topology and routing of application data traffic in order to efficiently allocate available network resources among uncoordinated application traffic flows. As the number of mobile communications nodes increases, the number of potential link configurations, the number of potential routes, and the volume of application data traffic shared in mobile-to-mobile, mobile-to-fixed, and fixed-to-mobile inter-nodal communications also increase, potentially taxing the computational resources of the management service and compromising its ability to generate optimal or near-optimal link topology policies and routes within usefully short periods of time. If the management service becomes overwhelmed, the ability of the network to service application traffic flows can become degraded as the configuration and allocation of network resources can become misaligned with current demands upon the directional wireless network.

Prior art management services and optimization frameworks tend to deterministically work through a link topology solution space, so that as the complexity of the optimization problem increases, computational resource limitations prevent the management service from generating optimized link topology policies and routes in real or near-real time. On the other hand, prior art management services and optimization frameworks which employ time-limited, randomized searches within a link topology solution space do not reliably generate optimized link topology policies that are capable of supporting traffic flows with particularized network demands, such as bandwidth requirements, jitter requirements, and delay requirements, when restricted to real or near-real time searches.

The changing spatial relationships between mobile communications nodes, fixed communications nodes, and obstructions (such as terrain) in directional wireless communications networks requires that management services dynamically plan and configure at least the network link topology based upon varying resource requests, varying physical layer constraints, and varying mission criteria which create additional constraints with respect to network resources and demand. Accordingly, scientists and engineers continue to seek improved topology management systems for wireless communications networks, and particularly directional wireless networks involving mobile communications nodes.

SUMMARY

Presented is a system and method for managing the link topology of a directional wireless network having mobile communications nodes. The system includes a network manager node adapted to receive resource requests from a plurality of communications nodes; a processor executing a management service; and a plurality of mobile communications node communicating resource requests to the network manager node for processing by the management service. The processor is adapted to execute the method for managing the link topology of the directional wireless network.

In a first aspect of the method, a management service in communication with the network manager node carries out the steps of receiving a plurality of resource requests from a plurality of mobile communications nodes, classifying the received plurality of resource requests as at least one class of traffic flow overlay having one or more specified constraints, determining a link topology solution based upon the at least one class of overlay and the one or more specified constraints, and publishing a topology policy based upon an optimized link topology solution to the plurality of mobile communications nodes.

The topology policy may be published as a decomposed topology policy individually directed at each communications node, or as a unitary topology policy broadcast to the directional wireless network. Agents in each communications node will typically be tasked with implementing the link topology policy and resultant routes for that communications node, as well as collecting and sending resource requests, in the form of a demand metric, to the management service from the communications node.

The features, functions, and advantages discussed herein can be achieved independently in various embodiments of the invention or may be combined in yet other embodiments of the invention, examples of which can be seen with reference to the following description and drawings.

BRIEF DESCRIPTION OF THE DRAWINGS

The accompanying figures depict various embodiments of the system and method. A brief description of each figure is provided below.

DETAILED DESCRIPTION

Figure 1:
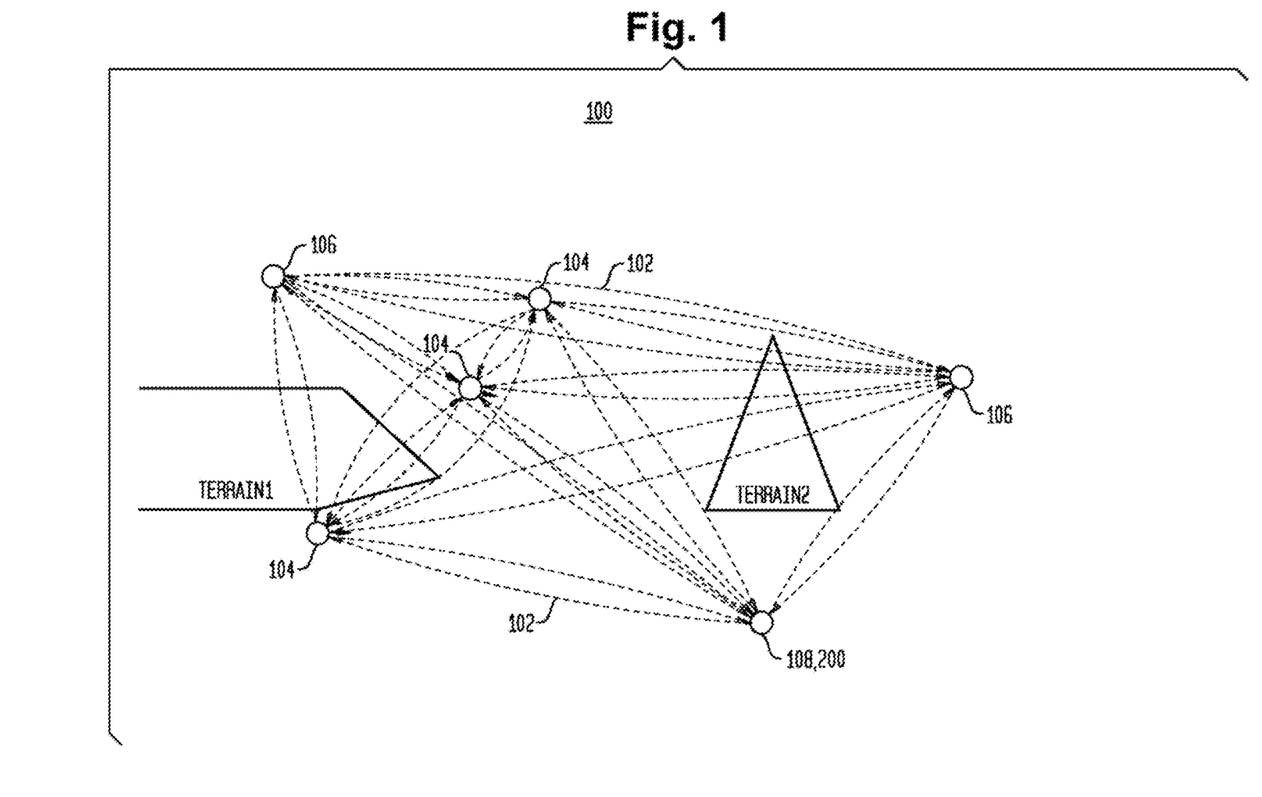
FIG. 1 is an illustration of a directional wireless communications network showing potential communications arcs among distributed communications nodes.

With initial reference to FIG. 1, a directional wireless communications network 100 with high bandwidth bidirectional links 102 can provide a stable network with sufficient resources to support the sharing and reporting of high fidelity Intelligence, Surveillance, and Reconnaissance (ISR) data and/or tactical data. In instances where mobile communications nodes 104 are members of the network 100, a manager must dynamically manage the link topology and routing infrastructure to make efficient use network resources as well as to support frequently changing mission demands. In networks implementing the OSI model of abstraction layers, this manager is a management service 200 directing operations within at least one of the physical, data link, and network layers of the wireless communications network 100. The management service 200 may be executed within and communicate with a mobile communications node 104 or a fixed communications node 106, but most frequently would be executed within a network operations center having greater computational resources than those available in a typical communications node 104 or 106. A processor executing the management service may communicate internally with the communications node 104 or 106, or communicate over a remote link to a communications node 104 or 106 so as to provide a remote point of presence in the directional wireless network 100. The network operations center may thus be located within an area of operations, or located remotely from the area of operations in a headquarters unit. The management service's point of presence within the directional wireless communications network 100 is generically referred to as a network manager node 108. In the illustrated example, this network manager node 108 could be sited in a network operations center located within the area of operations.

Figure 2:
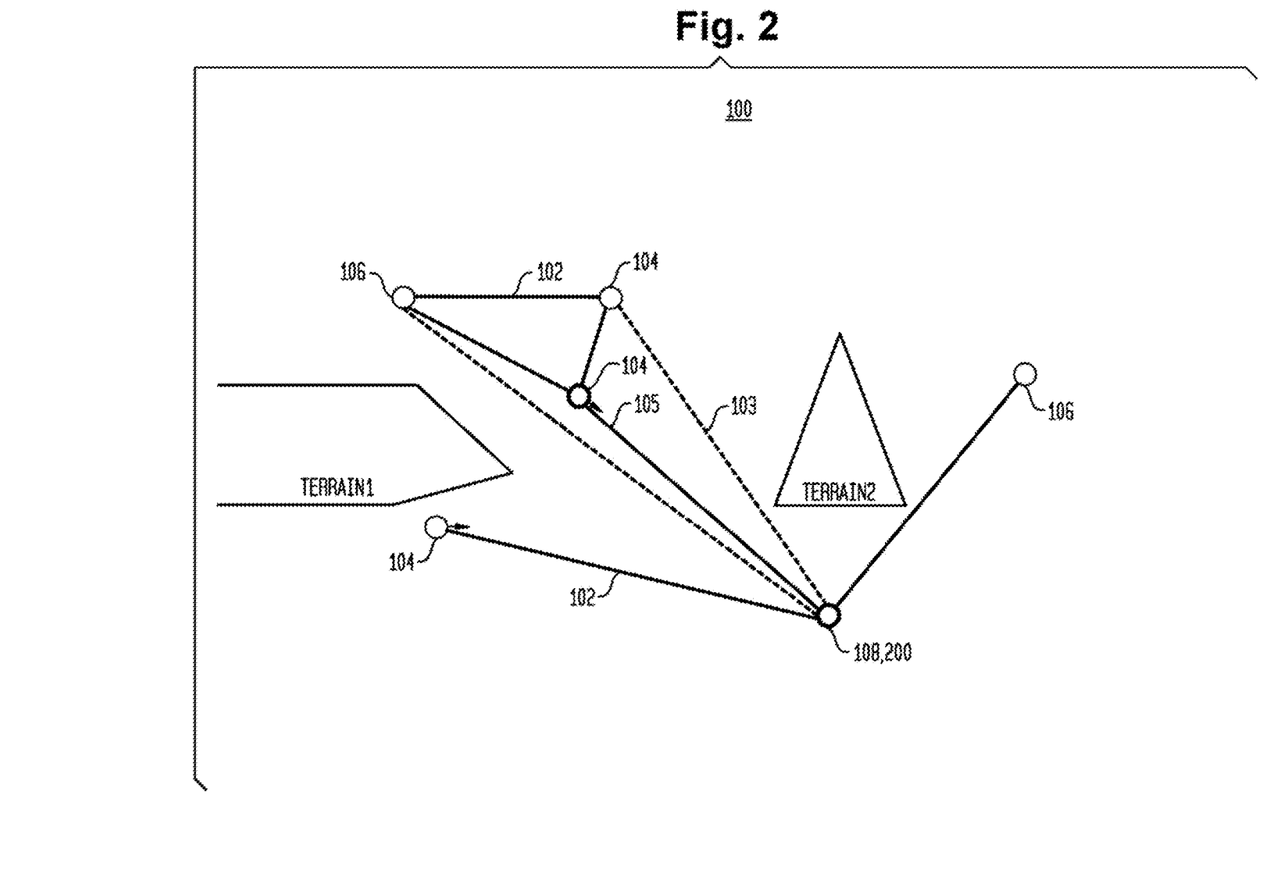
FIG. 2 is an illustration of the directional wireless communications network of FIG. 1 showing an exemplary link topology.

In current networks, the communications nodes 104 and 106 require dedicated devices for each of the high-bandwidth directional links 102. The size and the cost of the devices limit the number of high-bandwidth links available to typical communications nodes. With further reference to FIG. 2, a network topology may be limited due to each communications node 104 or 106 supporting, for example, no more than three directional links. Thus, for example, alternate directional links 103 may be available between communications nodes 104 and 106, however not all potential links may be utilized by the network 100 in an optimal link solution due to a constraint. The constraints may be specified to the management service for use in constructing the link topology. Such a specified constraint could be a physical constraint on the number of links 102 supported by each communications node, a situational constraint such as a lack of a line-of-sight between nodes due to an intervening obstruction such as terrain, or the like, as further discussed below.

In addition, although not specifically illustrated, the applications operating across such a network 100 may require varying network resources and/or capabilities, including security (encryption), priority (e.g., for tactical data over ISR data), minimum bandwidth, maximum jitter, and maximum delay. Thus, for example, an advanced directional link 105 between an advanced mobile communications node 104 (shown as a thickened circle) and an advanced network manager node 108 (also shown as a thickened circle) may be preferred over a potential legacy directional link 103 to a less capable mobile communications node 104 or fixed communications node 106 (shown as thinner circles).

At a later time, such as after movement of some of the mobile communications nodes 104, changes to the constraints may permit the use of a more efficient or capable network link topology. Thus, with further reference to FIG. 3, based upon new specified constraints, such as new lines of sight between mobile communications nodes 104, the management service 200 may determine a new link topology solution and publish a new topology policy to the directional wireless network 100 to create a new network of high bandwidth bidirectional links 102.

Figure 3:
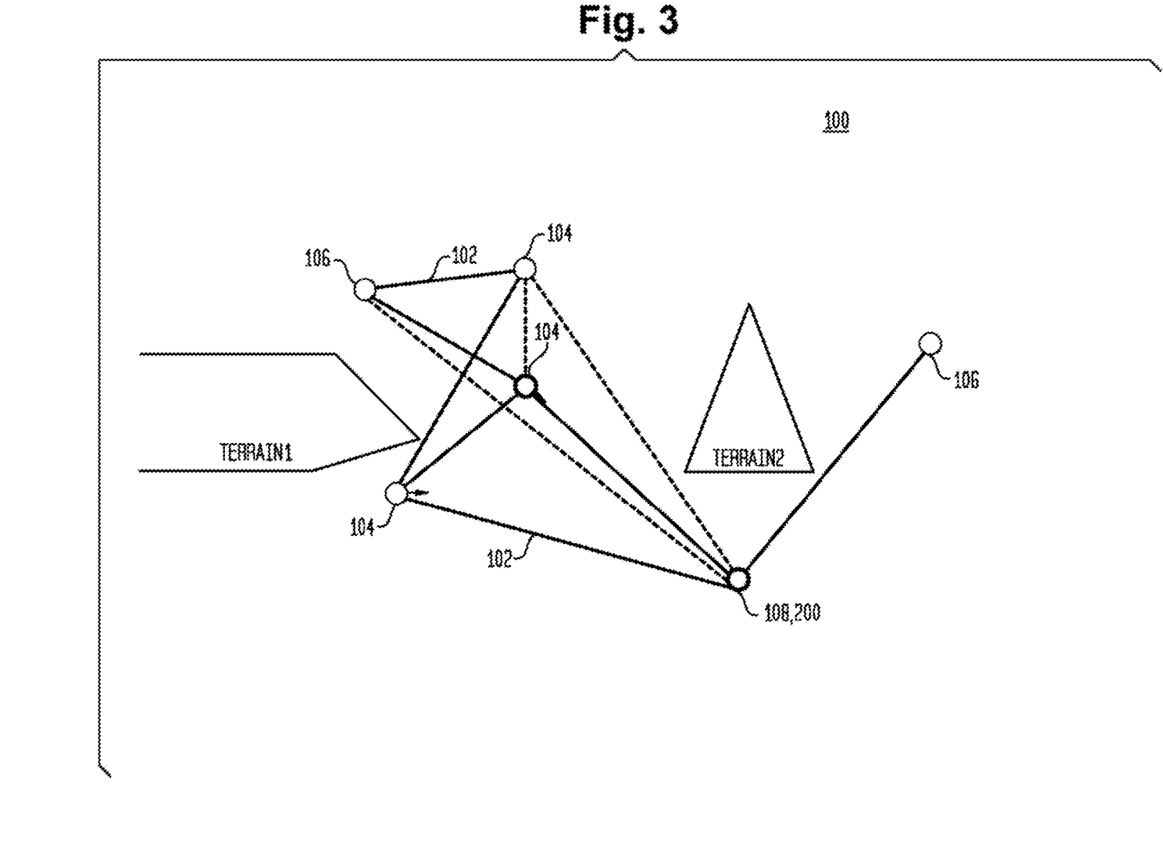
FIG. 3 is an illustration of the directional wireless communications network of FIG. 1, after movement of two of the mobile communications nodes 104, showing another exemplary link topology.

The management service 200 allows for the dynamic planning and configuration of the network in order to support mission demands such as secure, high speed redundant links between source and destination nodes for particular data flows. Operations personnel may be provided with means to switch between a particular solver for the network topology problem, such as a mixed integer linear programming (MIP) solver or a heuristic solver, in order to generate network topologies to support a mission at a desired level of performance within a desired solution time. While embodiments of the invention may make use of a MIP solver, in many aspects the management service 200 implements a particular solver known as a Lagrangian Relaxation (LR) solver and a Lagrangian heuristic. The use of such a solver may substantially reduce the time to yield a near-optimal link topology solution.

Figure 4:
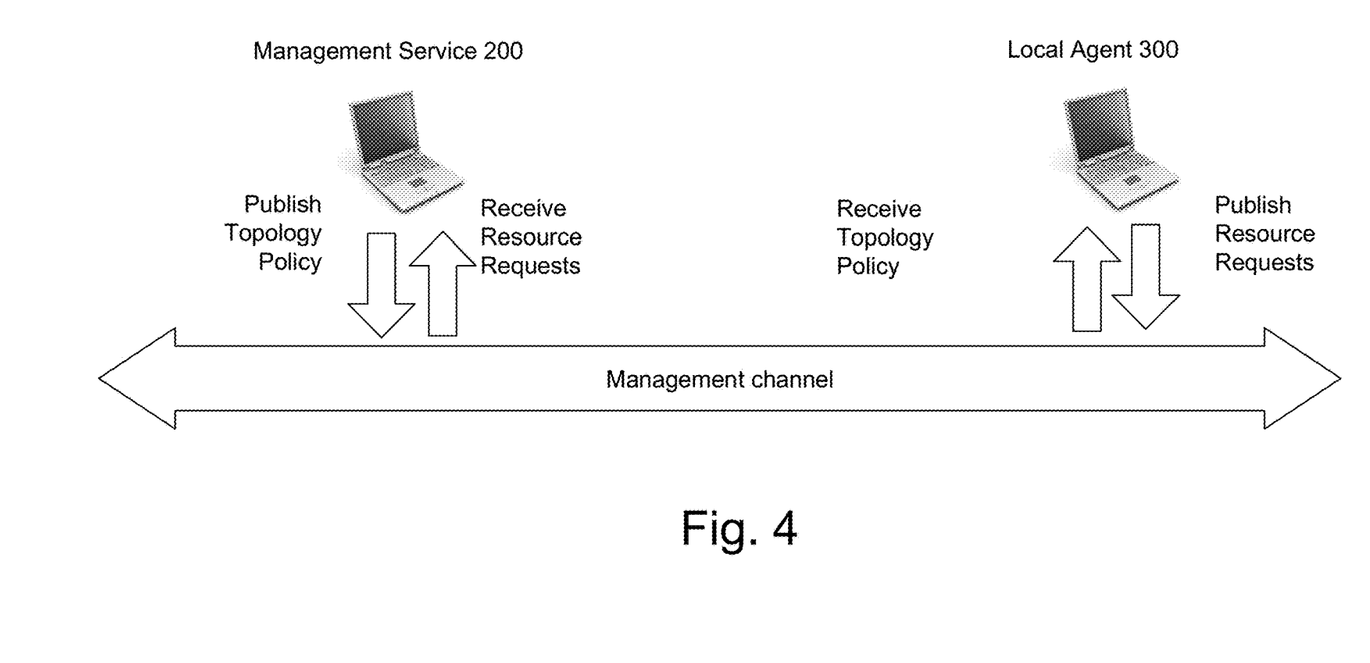
FIG. 4 is an illustration of communications between a management service and local agents across a management channel.

Turning now to FIG. 4, the communications nodes 104 and 106 each contain a local agent 300. The local agents may communicate with the management service 200, through the manager node 108, over a management message channel. The management message channel may be an out-of-band omni-directional communications link or an in-band management channel that is established as nodes are discovered and added to the network through a neighbor discovery process. During an initialization phase, the local agents 300 may preload an initial network demand profile into a demand array and publish a demand metric across the management message channel. The local agents 300 may also publish location data, e.g., GPS coordinates, for the node along with the demand metric. During a subsequent operation phase, the local agents 300 process real-time network demand data, which may be generated by custom or off-the-shelf traffic monitoring tools such as NetFlow marketed by Cisco Systems, Inc., to collect and publish demand metrics that are based upon mission demand along with updated location data for the node. The local agents also subscribe to topology policies published by the management service over the management message channel. The local agents apply the published policies to the directional communications hardware of the communications node to establish point-to-point links between communications nodes 104 and 106.

The management service 200 subscribes to the demand metrics published by the local agents, treating the demand metrics as resource requests by the respective communications nodes 104 and 106—i.e., the real-time demand data will include data concerning successfully and unsuccessfully transmitted traffic flows, such that the demand metric reflects resource demand rather than resource utilization. The management service 200 receives these resource requests from the plurality of communications nodes in the directional wireless network 100, and may store the resource requests/demand metrics in a resource demand repository 210 (shown in FIG. 5). The management service 200 may then periodically process the requests/demand metrics stored in the resource demand repository 210 to generate a matrix in which the resource requests are classified into at least one class of traffic flow overlay, and the classes of traffic flow overlay are associated with one or more specified constraints. The management service then generates an optimization problem—i.e., the link topology problem—based upon the specified constraints for a solver such as the aforementioned MIP or LR solvers. The management service then solves the problem and published the solution as a topology policy to the local agents 300 through the management channel. The local agents 300, upon receipt of the topology policy, will apply the published policies to their node 104 or 106 to implement the link topology solution determined by the management service 200.

Figure 5:
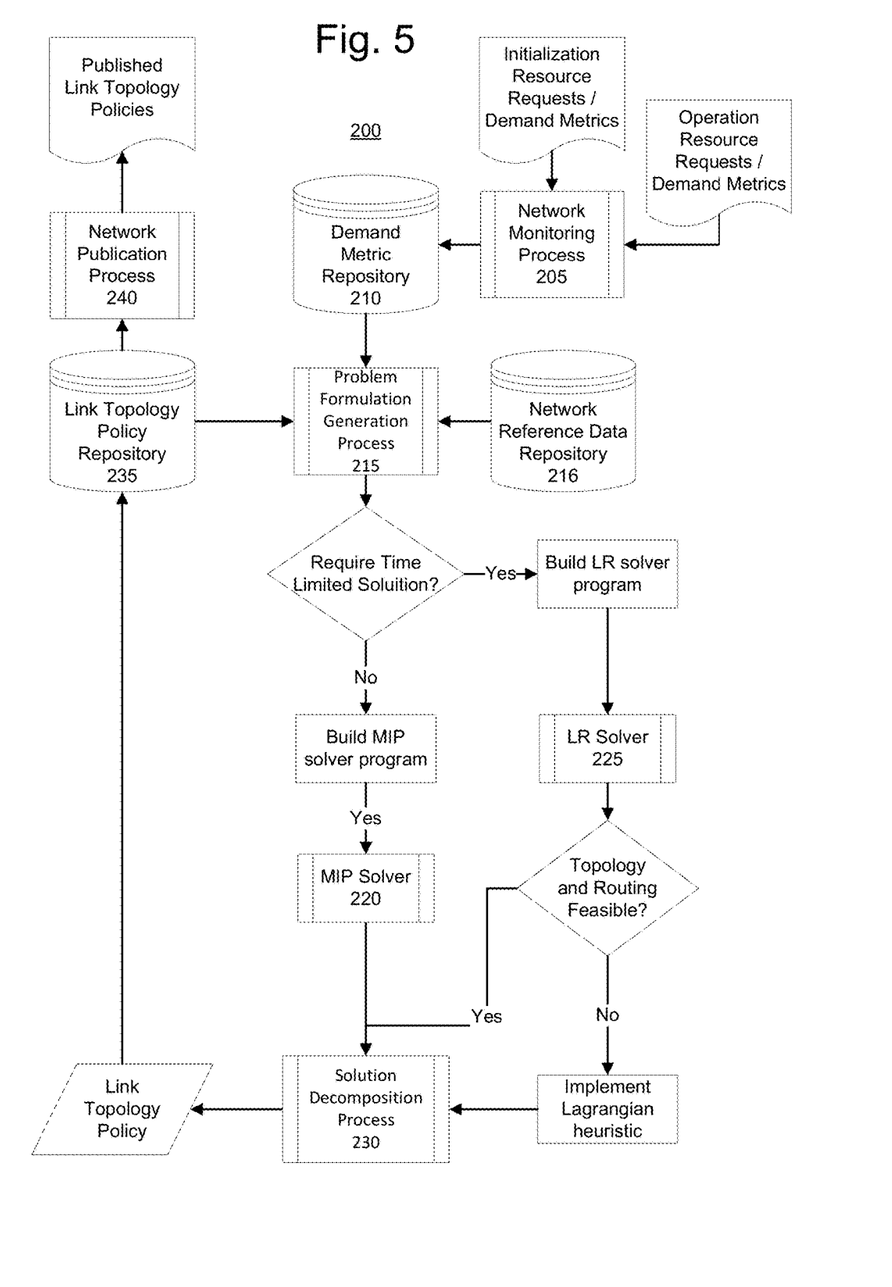
FIG. 5 is a schematic diagram of an implementation of a management service.

Turning now to FIG. 5, in an exemplary embodiment of the management service 200, the management service includes a network monitoring process 205 which receives resource requests from the plurality of communications nodes, the aforementioned resource demand repository 210, a problem formulation generation process 215 which classifies the resource requests into traffic flow overlays and generates the optimization problem based upon associated specified constraints, an MIP solver 220, an LR solver 225, a solution decomposition process 230 which decomposes the link topology solution into a network-wide or node-wise link topology policy, a link topology policy repository 235 which stores the link topology policies to record network state reference points and to document changes in network topology for mission post-processing, and a network publication process 240 which publishes the link topology policies to local agents 300 in the communications nodes 104 and 106. The problem formulation generation process 215, in general, classifies the resource demands from the plurality of communications nodes into one or more traffic flow overlays comprising a source node, a destination node, a bandwidth requirement, and a priority ranking. The problem formulation generation process 215 also associates the one or more traffic flow overlays with one or more specified constraints. Such specified constraints may include one or more general specified constraints which are not specific to the particular traffic flow overlay. For example, a mobile communications node 104 may be limited to participating in no more than k high bandwidth bidirectional links 102. However, in other implementations more granular general specified constraints may be used for, e.g., unidirectional free space optical links where high bandwidth communication from a first node to a second node does not necessarily entail or permit high bandwidth communication from the second node to the first node (absent appropriate configuration of a second free space optical link along a return arc). Such general specified constraints may include bidirectional links, the capacity of the links per node, the number of links per node, link availability between nodes based upon node location and orientation (derived from location data and known node characteristics), link availability between nodes based upon environmental obstructions (e.g., persistent interruptions to line-of-sight for free space optical links), link stability/error rate of links between nodes (e.g., transient interruptions to or interference with signaling), and per-hop timing/delay requirements. Such specified constraints may also or alternately include one or more overlay specific specified constraints which are associated with one or more, but not generally all, classes of traffic flow overlay. For example, a class of traffic flow overlay may require path redundancy, such that traffic flows of that class between a source node and a destination node may not traverse the same arc or intermediate node. For further example, a class of traffic flow may require flow integrity, such that traffic flows of that class between a source node and a destination node may not be split across multiple paths. Such overlay specific constrains may include path redundancy, flow integrality, flow priority, and flow security classification.

In a simplified example of the function of problem formulation generation process 215, the process may classify resource requests into a single class of traffic flow overlays and generate matrices for the traffic flows f where $x_{ij,l,n}^{f}=1$ if flow $f$ is sent across an arc corresponding to node combination $(n_i, n_j)$ on the $n$th possible instance of a link of type $l$ (and 0 otherwise),   (Eq. No. 1)

and for the link types l, where $u_{ij}^{l,n}=1$ if the $n$th possible instance of a link of type $l$ is assigned to the arc corresponding to node combination $(n_i, n_j)$ (and =0 otherwise).   (Eq. No. 2)

Specified constraints are associated with the matrices to exclude impossible or undesired link topology solutions. For example:

Specified Constraint 1: Flow Balance (ie., Flow Entering a Node Must Leave a Node, and Flow Leaving a Node Must Have Entered the Node)

$$\sum_{j \in IN(i); (l,n) \in L} x_{ji,l,n}^{f} - \sum_{j \in ON(i); (l,n) \in L} x_{ij,l,n}^{f} = b(i, f) \quad \text{(Eq. No. 3)}$$

for all possible node $i$ and flow $f$ combinations where b(i,f) is the supply/demand of flow f at node i; IN(i) is the set of nodes i for which flow from node j to node i is a possibility; ON(i) is the set of nodes j for which flow from node i to node j is a possibility; and L is the set of possible (link type l, and link instance n) combinations.

Specified Constraint 2: Bidirectional Links

Assuming that links between nodes must be of the same type, $u_{ij}^{l,n}=u_{ji}^{l,n}$ for all possible $(i,j,l,n)$ combinations.   (Eq. No. 4)

where the communications hardware is limited, in effect, to creating bidirectional communication links as opposed to directionally independent transmission and reception links.

Specified Constraint 3: Capacity of the Links per Node $$\sum_{f \in C(i,j)} bw(f) x_{ij,l,n}^{f} \le cap(l) u_{ij}^{l,n} \quad \text{(Eq. No. 5)}$$

for all possible $(i, j, l, n)$ combinations where bw(f) is the bandwidth requirement for flow f; C(i,j) is the set of flows that could be assigned to flow from node i to node j; and cap(l) is the bandwidth capacity of link type l.

Specified Constraint 4: Number of Links per Node $$\sum_{j \in IN(i); n \in L(l)} u_{ji}^{l,n} + \sum_{j \in ON(i); n \in L(l)} u_{ij}^{l,n} \le K(l) \quad \text{(Eq. No. 6)}$$

for all node $i$ and link type $l$ combinations for which there is a constraint where at most K(l) total links of type l are possible at each node (i.e., summing both in-bound and out-bound links); IN(i) is the set of nodes i for which flow from node j to node i is a possibility; ON(i) is the set of nodes j for which flow from node i to node j is a possibility; and L(l) is the set of possible instances n of link type l.

Specified Constraint 5: Redundancy $$\sum_{i \in IN(j); (l,n) \in L} x_{ij,l,n}^{f1} + \sum_{i \in IN(j); (l,n) \in L} x_{ij,l,n}^{f2} \leq 1 \quad \text{(Eq. No. 7)}$$

for all node $j$ except for the final node $j$ for flow $f$ and flows $f$ for which there is redundancy where two flow variables f1 and f2 are included each time a flow f is to have a redundant path; IN(j) is the set of nodes i for which flow from node j to node i is a possibility; and L is the set of possible (link type l, and link instance n) combinations.

Specified Constraint 6: Flow Integrality $$x_{ij,l,n}^{f} \in \{0,1\} \text{ for all possible } (i,j,f,l,n) \text{ combinations} \quad \text{(Eq. No. 8)}$$

so that traffic flow f from source node i to destination node j may not be split.

Constraints for link availability between nodes based upon node location and orientation may be based upon known methods for calculating or using a structural interference matrix to determine interference based upon the relative location of a communications source and/or target. Similarly, constraints for link availability between nodes based upon environmental obstructions may be based upon known methods for using a topographical matrix such as a Digital Elevation Model (DEM) to determine whether a line-of-sight exists between a communications source and target. Additionally, constraints for link stability/error rate may be compared with estimates of the impact of local meteorological and/or atmospheric conditions upon signal strength and interference levels. Where the determination of whether a constraint exists is based upon the results of complex modeling calculations such as a structural interference matrix, topographical matrix, or environmental modeling, the problem formulation generation process 215 may perform the determination in combination with a network reference data repository 216 containing preprocessed reference data such as interference levels for varying relative locations of each communications source and target.

The mixed integer linear programming solver or MIP solver 220 may use or be similar to known solvers such as the ILOG CPLEX Optimizer marketed by International Business Machines Corporation (a.k.a. IBM) and the COIN Branch and Cut solver (a.k.a. CBC) distributed through the COIN-OR Foundation, Inc. Such solvers minimize or maximize problems of the form:

$c_1x_1 + c_2x_2 + \ldots + c_nx_n$
subject to:
$a_{11}x_1 + a_{12}x_2 + \ldots + a_{1n}x_n \sim b_1$
$a_{21}x_1 + a_{22}x_2 + \ldots + a_{2n}x_n \sim b_m$
$\ldots$
$a_{m1}x_1 + a_{m2}x_2 + \ldots + a_{mn}x_n \sim b_m$
within the bounds:
$l_1 \leq x_1 \leq u_1$
$l_n \leq x_n \leq u_n$ where the variables can be binary, integer, or continuous. The solution is a vector of values, corresponding to the variables $x_{ij,l,n}^{f}$, which yields an optimal objective. For such a solver, the objective function for the link topology problem may be expressed as:

$$\min \sum_{(f,i_s,i_d) \in Il} w(f) x_{i_s i_d}^{f} \quad \text{(Eq. No. 9)}$$

where w(f) is the weight (value) of the traffic flow f; $i_s$ is the source node for the traffic flow f; $i_d$ is a destination node for the traffic flow f; and, Il is the set of all possible (f,$i_s$, $i_d$) combinations.

The solution generated by the MIP solver may then be passed to the solution decomposition process 230. The solution decomposition process 230 may generate a link topology policy—i.e., a set of instructions to local agents concerning the configuration of point-to-point links to (transmission) and, potentially, from (reception) other nodes in the directional wireless network 100.

The Lagrangian Relaxation solver or LR solver 225 may implement the following general procedure. If the primal program (P) is structured in the form:

(P) max $c^T x$ where $c^T x$ may be the objective function for the link topology problem, subject to, for example:

$A_1 x \leq b_1$
$A_2 x \leq b_2$
for $x \geq 0$ where $A_1 x \leq b_1$ and $A_2 x \leq b_2$ may be specified constraints, then it may be assumed that if specified constraints $A_2 x \leq b_2$ were not in the problem formulation that the problem would be easy, or easier, to solve—i.e., that an algorithm satisfying a time-limited solution exists or would be more likely to reach an optimal or near-optimal solution. A related problem, known as the Lagrangian Dual, can be constructed, where:

$LD(\lambda) = \max c^T x + \lambda^T (b_2 - A_2 x)$
$A_1 x \leq b_1$
for $x \geq 0$, with a specified $\lambda \geq 0$.

For any $\lambda \geq 0$, $LD(\lambda)$ provides an upper bound on the optimal objective function value for the primal program (P). By searching for the smallest upper bound possible, or solving:

$$(LD) \min_{\lambda \geq 0} LD(\lambda)$$

optimal dual variables $\lambda^*$ can be determined. Solving (LD) is a nonsmooth optimization problem, and the primal variables x used to generate an optimal solution to the Lagrangian Dual (LD) might not be feasible for the original primal program (P). If the primal variables x are feasible, then they are an optimal solution to the original problem. If the primal variables x are not feasible, then the optimal dual variables $\lambda^*$, potentially with the primal variables x, can be used to construct a feasible and typically near-optimal solution to the primal program (P). The construction process is termed a Lagrangian heuristic.

Example 1

A primal program (P) subject to specified constraints 1-4 and 6 (in this example, lacking a redundancy constraint) may be considered where the Capacity of the Links per Node specified constraint and the Number of Links per Node specified constraint are relaxed into the objective function. The optimization problem consequently becomes two subproblems amenable to efficient solution: (1) solving a minimum cost network flow problem for each flow f and (2) choosing, for each link type l, the links of that type to add to the wireless directional network while considering the reduced costs of adding the links. The solution to the second subproblem may calculate the reduced costs for the variables corresponding to adding links to the network, and then adding the links with either non-positive or negative reduced costs.

Subproblem (1)

A portion of the Lagrangian Dual objective function corresponding to the first subproblem includes the portion of $c^T x - \lambda^T(A_2 x)$ corresponding to the flow management variables, i.e.:

$$c^T x - \lambda^T(A_2 x) = \qquad \text{(Eq. No. 10)}$$
$$-\sum_{(f, i_s, i_d) \in \mathit{ll}} w(f) x^f_{i_s i_d} - \sum_{(i,j):(n_i, n_j) \in A; (l,n) \in L} \lambda^{l,n}_{ij} \left( \sum_{f \in C(i,j)} bw(f) x^f_{ij,l,n} \right)$$

where $w(f)$ is the weight (value) of the traffic flow f, $i_s$ is the source node for the traffic flow f; $i_d$ is the destination node for the traffic flow f; Il is the set of all possible $(f, i_s, i_d)$ combinations; A is the set of arcs in the network; L is the set of possible (link type l, and link instance n) combinations; $bw(f)$ is the bandwidth requirement for flow f; $C(i,j)$ is the set of flows that could be assigned to flow from node i to node j; and $cap(l)$ is the bandwidth capacity of link type l.

Subproblem (2)

A portion of the Lagrangian Dual objective function corresponding to the second subproblem includes the portion of $c^T x - \lambda^T(A_2 x)$ corresponding to the design variables, i.e.:

$$c^T x - \lambda^T(A_2 x) = \sum_{(i,j):(n_i,n_j) \in A;(l,n) \in L} \lambda^{l,n}_{ij} \, cap(l) u^{l,n}_{ij} - \qquad \text{(Eq. No. 11)}$$
$$\sum_{(n_i,l) \in LCC} \gamma^l_{n_i} \left( \sum_{j \in IN(i); n \in L(l)} u^{l,n}_{ji} + \sum_{j \in ON(i); n \in L(l)} u^{l,n}_{ij} \right)$$

where $cap(l)$ is the bandwidth capacity of link type l; A is the set of arcs in the network; IN(i) is the set of nodes i for which flow from node j to node i is a possibility; ON(i) is the set of nodes j for which flow from node i to node j is a possibility; L(l) is the set of possible instances n of link type l; LCC is the set of $(n_i, l)$ combinations where there is a constraint on the number of links of type l going into and out of node $n_i$; and, $\gamma$ is used to denote the dual variables corresponding to the Number of Links per Node specified constraint.

The portion of the Lagrangian Dual objective function corresponding to the right-hand side of the constraints and dual variables is:

$\lambda^T b_2^1 + \gamma^T b_2^2$ where $b_2^1$ corresponds to the right-hand side of the Capacity of the Links per Node specified constraint(s), and is a the vector of all zeros, and $b_2^2$ corresponds to the right-hand side of the Number of Links per Node specified constraint(s), and is a vector with entries equal to $K(l)$.

As a result, the portion of the Lagrangian Dual objective function corresponding to the right-hand side of the constraints may be expressed as:

$$\sum_{(n_j,l) \in LCC} K(l) * \gamma^l_{n_j}$$

where N is the set of nodes in the network; LCC is the set of $(n_i, l)$ combinations where there is a constraint on the number of links of type l going into and out of node $n_i$; and, $K(l)$ is the maximum number of links of type l possible at each node.

The subgradient of $c^T x + \lambda^T(b_2 - A_2 x)$ for the given dual variables, $\lambda$, may be expressed by $$b_2 - A_2 x = \left( -\sum_{f \in C(i,j)} bw(f) x^f_{ij,l,n} + cap(l) u^{l,n}_{ij} \right) \qquad \text{(Eq. No. 12)}$$

for the entry corresponding to the Capacity of the Links per Node constraint for link $(n_i, n_j)$ and for $(l, n) \in L$ where $bw(f)$ is the bandwidth requirement for flow f, $C(i,j)$ is the set of flows that could be assigned to flow from node i to node j; $cap(l)$ is the bandwidth capacity of link type l; and L is the set of possible (link type l, and link instance n) combinations.

and $$b_2 - A_2 x = \left( K(l) - \sum_{j \in IN(i); n \in L(l)} u^{l,n}_{ji} - \sum_{j \in ON(i); n \in L(l)} u^{l,n}_{ij} \right) \qquad \text{(Eq. No. 13)}$$

for the entry corresponding to the Number of Links per Node constraint on the number of links of type $l$ that can be added to a node for all nodes $n_i$ where at most $K(l)$ total links of type l are possible at each node (i.e., summing both in-bound and out-bound links); IN(i) is the set of nodes i for which flow from node j to node i is a possibility; ON(i) is the set of nodes j for which flow from node i to node j is a possibility; and L(l) is the set of possible instances n of link type l.

At each iteration of the LR solver 225, a function value and subgradient are calculated, where these items depend upon the dual variables $\lambda$. The optimal dual variables $\lambda^*$ and associated primal variables x are determined, and the feasibility of the primal variables x is determined. If the solution determined by the Lagrangian Relaxation solver or LR solver 225 is not feasible, then the solver may implement a Lagrangian heuristic to determine a feasible network topology solution. The LR solver 225 may evaluate the reduced costs for the design variables and use a greedy algorithm to determine which links should be added to the network. The reduced costs for (implementing the Bidirectional Link constraint) will have the form:

$$RC(u^{l,n}_{ij}) = cap(l) \lambda^{l,n}_{ij} - \gamma^l_{n_i} - \gamma^l_{n_j} \qquad \text{(Eq. No. 14)}$$

where $cap(l)$ is the bandwidth capacity of link type l; and, $\gamma$ is used to denote the dual variables corresponding to the Number of Links per Node specified constraint, so that the reduced cost for adding a bidirectional link between nodes $n_j$ and $n_i$ is:

$$RC(u^{l,n}_{ij}) + RC(u^{l,n}_{ji}) = cap(l)(\gamma^{l,n}_{ij} + \gamma^{l,n}_{ji}) - 2(\gamma_{n_i} + \gamma_{n_j}). \qquad \text{(Eq. No. 15)}$$

The greedy algorithm orders the reduced costs from largest to smallest. Links between nodes are added to the network according to the order while satisfying the Number of Links per Node specified constraint. The greedy algorithm stops adding links to the network if the next reduced cost is not non-negative.

Other dual variable information can be used in a Lagrangian heuristic as well. For example, the dual variables corresponding to the capacity constraints for the flows can be used. In varying implementations, multiple Lagrangian heuristics may be used, returning a set of candidate near-optimal link topologies which may be compared for relative optimality.

The link topology solution determined by the Lagrangian Relaxation solver or LR solver 225, without (if feasible) or with (if not initially feasible) the Lagrangian heuristic, may then be passed to the solution decomposition process 230. The solution decomposition process 230 may generate a link topology policy—i.e., a set of instructions to local agents concerning the configuration of point-to-point links to (transmission) and, potentially, from (reception) other nodes in the directional wireless network 100.

Figure 6:
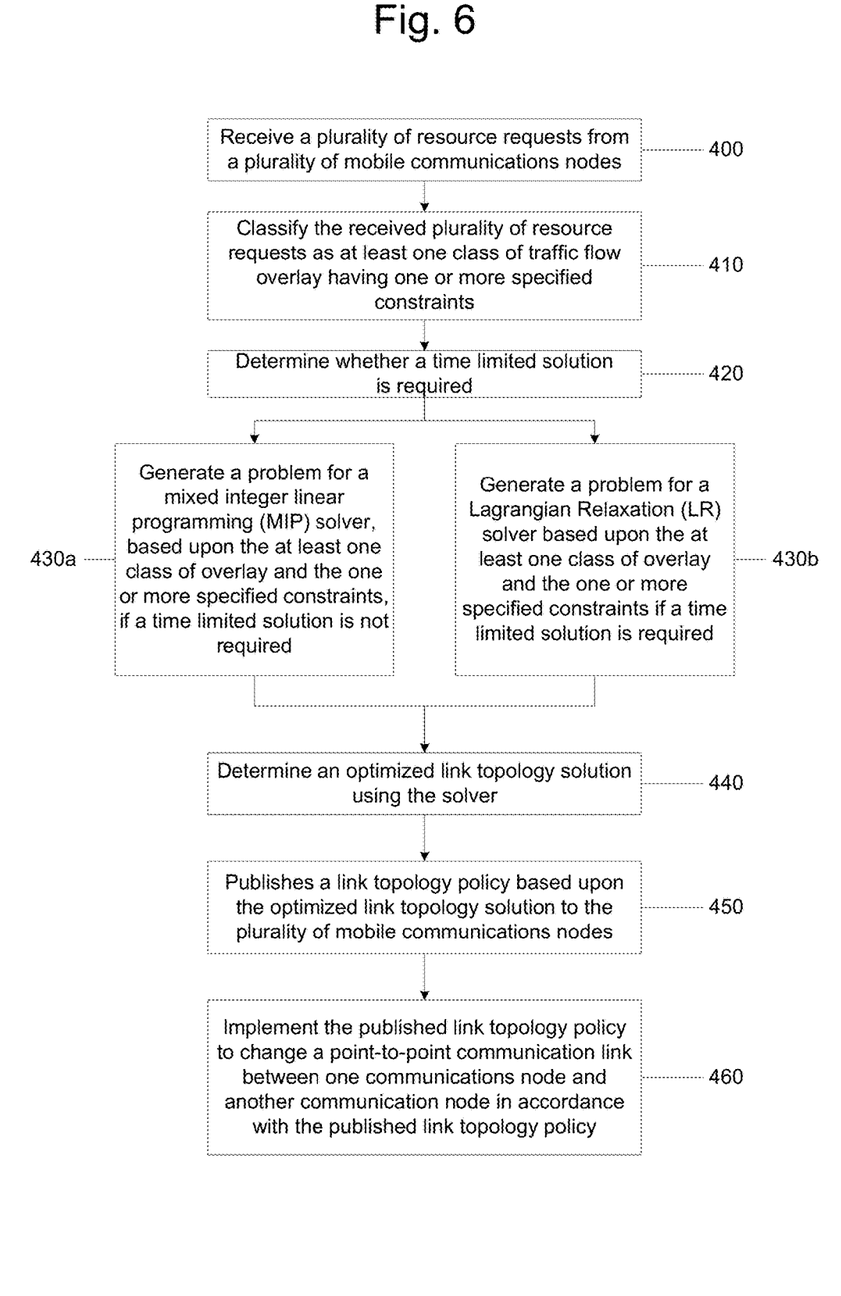
FIG. 6 is a flow diagram of the steps of an exemplary method.

Referring now to FIG. 6, an exemplary method for managing the link topology of a directional wireless network having mobile communications nodes is shown. In step 400, the method receives a plurality of resource requests from a plurality of mobile communications nodes. In step 410, the method classifies the received plurality of resource requests as at least one class of traffic flow overlay having one or more specified constraints. In step 420, the method may determine whether a time limited solution is required. In step 430*a*, the method may generate a problem for a mixed integer linear programming (MIP) solver based upon the at least one class of overlay and the one or more specified constraints if a time limited solution is not required. In step 430*b*, the method may generate a problem for a Lagrangian Relaxation (LR) solver based upon the at least one class of overlay and the one or more specified constraints if a time limited solution is required. In step 440, the method may determine an optimized link topology solution using the appropriate solver. However, the reader will appreciate that in other exemplary methods, step 420 may be omitted and the method may unconditionally generate a problem for a mixed integer linear programming (MIP) solver or, alternately, generate a problem for a Lagrangian Relaxation (LR) solver without consideration of a time limitation. In step 450, the method publishes a link topology policy based upon the optimized link topology solution to the plurality of mobile communications nodes. Finally, in step 460, the mobile communications nodes may implement the published link topology policy to change a point-to-point communication link between one communications node and another communication node in accordance with the published link topology policy. The reader will appreciate that the method is not limited to use with only mobile communications nodes, and may further encompass mobile-to-mobile, mobile-to-fixed, and fixed-to-mobile inter-nodal directional wireless communications topologies involving both mobile and fixed communications nodes.

The embodiments of the invention shown in the drawings and described above are exemplary of numerous embodiments that may be made within the scope of the appended claims. It is contemplated that numerous other configurations of a dynamic fusion management system and method may be created taking advantage of the disclosed approach.

It is the applicant's intention that the scope of the patent issuing herefrom will be limited only by the scope of the appended claims.

What is claimed is:

1. A system for managing the network link topology of a directional wireless network, the system comprising:
 a network manager node adapted to receive resource requests from a plurality of communications nodes;
 a processor executing a management service; and
 a plurality of mobile communications nodes communicating resource requests to the network manager node for processing by the management service;
 wherein the processor is adapted to execute a method for managing a network link topology defined by a plurality of spatially-distributed, wireless, directional communications signal links comprising a physical layer of a directional wireless network amongst the plurality of mobile communications nodes, the method comprising the steps of:
 receiving a plurality of resource requests from the plurality of mobile communications nodes;
 determining one or more constraints upon the establishment of point-to-point, wireless, directional communications signal links between a first node, a second node, and a third node of the plurality of mobile communications nodes based upon a description of interruptions to lines-of-sight amongst the first node, the second node, and the third node, the description including a structural interference matrix, a topographical matrix, or an environmental model;
 classifying the received plurality of resource requests as at least one class of traffic flow overlay having the one or more determined constraints;
 determining an optimized network link topology solution for the network link topology, wherein the determination of the optimized network link topology is carried out by a Lagrangian Relaxation solver using the at least one class of overlay and the one or more determined constraints; and
 publishing a network link topology policy based upon the optimized network link topology solution to the plurality of mobile communications nodes, wherein the network link topology policy directs the first node of the plurality of mobile communications nodes to terminate a point-to-point, directional, wireless communications signal link between the first node and the second node of the plurality of mobile communications nodes and to establish a point-to-point, directional, wireless communications signal link between the first node and the third node of the plurality of mobile communications nodes.

2. The system of claim 1, wherein the determination of the optimized network link topology solution is carried out by a Lagrangian Relaxation solver implementing a Lagrangian heuristic.

3. The system of claim 2, wherein the Lagrangian heuristic evaluates the reduced costs for adding a point-to-point, directional, wireless communications signal link between mobile communications nodes and uses a greedy algorithm to determine which point-to-point, directional, wireless communications signal links should be added to the network link topology solution.

4. The system of claim 1, wherein the step of determining one or more constraints includes evaluating one or more global specified constraints.

5. The system of claim 4, wherein the one or more global specified constraints are selected from the group consisting of a bidirectional link constraint, a capacity of the links per node constraint, and a number of links per node constraint.

6. The system of claim 1, wherein the step of determining one or more constraints includes evaluating one or more overlay specific specified constraints.

7. The system of claim 6, wherein the one or more overlay specific specified constraints are selected from the group consisting of a path redundancy constraint and a flow integrality constraint.

8. The system of claim 6, wherein each of the plurality of mobile communications nodes includes a local agent, and wherein the local agent establishes and terminates point-to-point, directional, wireless communications signal links between the respective communications node and the other communications nodes in accordance with the published link topology policy.

9. A method for managing a network link topology defined by a plurality of spatially-distributed, wireless, directional communications signal links comprising a physical layer of a directional wireless network amongst a plurality of mobile communications nodes, the method comprising the steps of:
receiving a plurality of resource requests from the plurality of mobile communications nodes;
determining one or more constraints upon the establishment of point-to-point, wireless, directional communications signal links between a first node, a second node, and a third node of the plurality of mobile communications nodes based upon a description of interruptions to lines-of-sight amongst the first node, the second node, and the third node, the description including a structural interference matrix, a topographical matrix, or an environmental model;
classifying the received plurality of resource requests as at least one class of traffic flow overlay having the one or more specified constraints;
determining an optimized network link topology solution for the network link topology, wherein the determination of the optimized network link topology is carried out by a Lagrangian Relaxation solver using the at least one class of overlay and the one or more determined constraints; and
publishing a network link topology policy based upon the optimized network link topology solution to the plurality of mobile communications nodes, wherein the network link topology policy directs the first node of the plurality of mobile communications nodes to terminate a point-to-point, directional, wireless communications signal link between the first node and the second node of the plurality of mobile communications nodes and to establish a point-to-point, directional, wireless communications signal link between the first node and the third node of the plurality of mobile communications nodes.

10. The method of claim 9, wherein the determination of the optimized network link topology solution is carried out by a Lagrangian Relaxation solution process followed by a Lagrangian heuristic process.

11. The method of claim 10, wherein the Lagrangian heuristic evaluates the reduced costs for adding a point-to-point, directional, wireless communications signal link between mobile communications nodes and uses a greedy algorithm to determine which point-to-point, directional, wireless communications signal links should be added to the network link topology solution.

12. The method of claim 9, wherein the step of determining one or more constraints includes evaluating one or more global specified constraints.

13. The method of claim 12, wherein the one or more global specified constraints are selected from the group consisting of a bidirectional link constraint, a capacity of the links per node constraint, and a number of links per node constraint.

14. The method of claim 9, wherein the one or more step of determining one or more constraints includes evaluating one or more overlay specific specified constraints.

15. The method of claim 14, wherein the one or more overlay specific specified constraints are selected from the group consisting of a path redundancy constraint and a flow integrality constraint.

16. The method of claim 9, further comprising the step of implementing the published network link topology policy to terminate a point-to-point, directional, wireless communications signal link between the first node and the second node in accordance with the published network link topology policy and to establish a point-to-point, directional, wireless communications signal link between the first node and the third node in accordance with the published network link topology policy.

* * * * *